Figure 1:
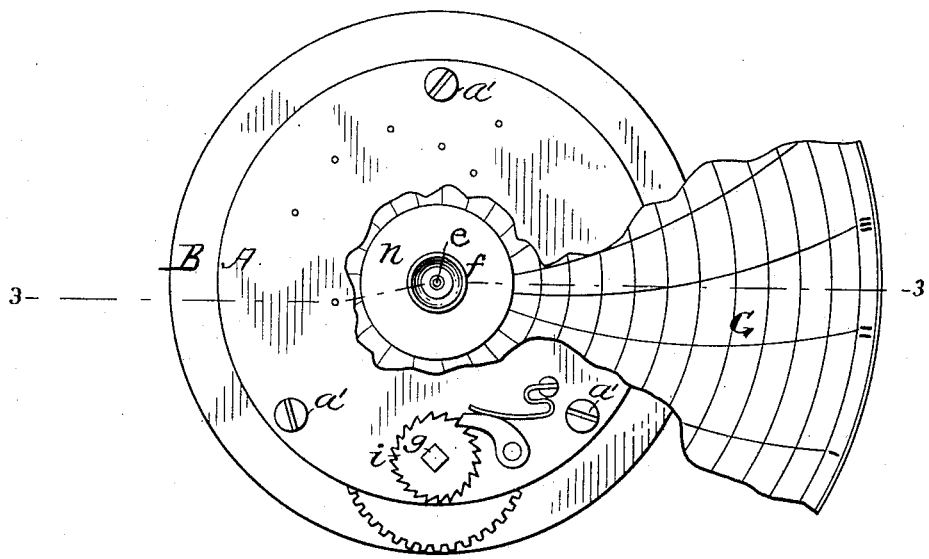

No. 744,203. PATENTED NOV. 17, 1903.
F. A. JONES.
CLOCK MOVEMENT.
APPLICATION FILED SEPT. 17, 1897.
NO MODEL. 2 SHEETS—SHEET 1.

WITNESSES:
A. D. Harrison.
C. C. Stecher

INVENTOR:
Florentine A. Jones

No. 744,203. PATENTED NOV. 17, 1903.
F. A. JONES.
CLOCK MOVEMENT.
APPLICATION FILED SEPT. 17, 1897.
NO MODEL. 2 SHEETS—SHEET 2.

WITNESSES:
A. D. Harrison.
C. C. Steeler

INVENTOR:
Florentine A. Jones

No. 744,203.

Patented November 17, 1903.

UNITED STATES PATENT OFFICE.

FLORENTINE A. JONES, OF BOSTON, MASSACHUSETTS, ASSIGNOR TO ELIZABETH M. HILL, OF BOSTON, MASSACHUSETTS.

CLOCK-MOVEMENT.

SPECIFICATION forming part of Letters Patent No. 744,203, dated November 17, 1903.

Application filed September 17, 1897. Serial No. 651,977. (No model.)

*To all whom it may concern:*

Be it known that I, FLORENTINE A. JONES, of Boston, in the county of Suffolk and State of Massachusetts, have invented certain new and useful Improvements in Clock-Movements for Gage Mechanisms, of which the following is a specification.

My invention relates to clock-movements, and more particularly to those movements which are employed for rotating the charts or dials of recording-gages.

The clock-movements now in general use in recording-gages are of the usual construction—that is, the center arbor makes one revolution in one hour, and upon this arbor is loosely placed a wheel upon which the recording chart or dial is affixed, said chart-carrying wheel being made to rotate upon the center arbor once in twenty-four hours by means of other wheels and pinions called "dial-works." The series of gears composing the "dial-works," so called, are entirely independent of the train-wheels of the clock—that is, they do not sustain the spring or motive power of the clock—and are usually placed on the outside of the top or bottom plate, the connection with the train being made by means of a small pinion called the "cannon-pinion," which is tightly fitted upon the center arbor outside of the plate. As these "dial-works," so called, simply turn the wheel loosely placed upon the center arbor carrying the chart or dial and do not transmit motion or power to any other part of the clock, it will readily be seen that they, and consequently the chart or dial, will be subject to loss of motion or "backlash," as it is termed, inasmuch as they may be and are naturally turned forward when putting on a chart and remain in that position until the natural running of the clock causes the center arbor to rotate sufficiently to take up the lost motion between the several gears composing the dial-works. This lost motion caused by the dial or chart not being fixed to one of the "train-arbors," so called, results in an error in the time-reading of the chart amounting to several minutes. As in recording-gages it is absolutely necessary that the recording chart or dial should rotate at the rate of one revolution in twenty-four hours, it follows that the chart cannot be fixed upon and made to rotate with the center arbor of the ordinary clock, since the center arbor makes one revolution in one hour. Moreover, there is no arbor in the clock-train which rotates once in twenty-four hours. Consequently in order to accomplish the desired object of immovably fixing the recording chart or dial upon an arbor which will rotate once in twenty-four hours it becomes necessary to make a clock-movement of a different construction in several important points from anything that is now used.

Hence the primary object of this invention is to prevent the backlash or lost motion of the dial or chart, whereby the record thereon may be made with the utmost accuracy. To accomplish this end, it is necessary that the center arbor or one of the arbors which sustains the power of the clock-movement be made to rotate once in twenty-four hours and that the chart or recording-dial be immovably fixed thereon and rotate with the arbor.

Another object of this invention is to improve the construction of clock-movements, so that a weaker spring or less power shall be required to operate a clock running eight days than has heretofore been required.

Still another object of this invention is to obtain a clock of unusually long running time with less friction and within a limit of power which shall conserve the isochronal qualities necessary to good timekeeping.

To these ends, therefore, my invention consists of a clock-movement for the purposes set forth possessing certain features of construction and relative arrangement of parts, all as fully illustrated on the drawings and now to be described in detail and then pointed in the claims hereto appended.

Reference is to be had to the accompanying drawings and to the letters and figures marked thereon, forming a part of this specification, similar letters and figures indicating similar parts or features, as the case may be, wherever they occur.

It will be borne in mind that it is not practical in drawings of the size shown to show the many details of teeth of wheels and leaves of the pinions in the actual and correct characters. Therefore reference should be had to the description as set forth in the specification for actual characters used.

Figure 2:
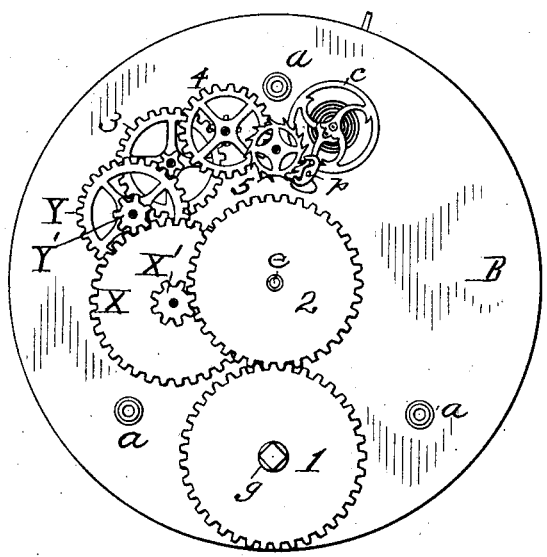
Figure 5:
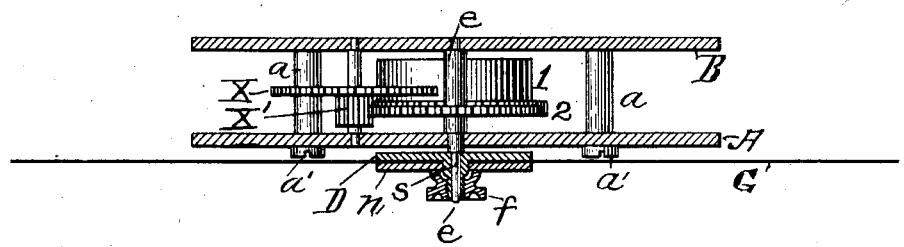

Of the drawings, Figure 1 illustrates a clock-movement in elevation containing my invention and showing a portion of a recording dial or chart attached to the center arbor. Fig. 2 is a clock-movement in elevation with the top plate removed, showing my invention and the combination of the trainwork of wheels and pinions, which is the same as represented in Fig. 1. Fig. 3 is a horizontal section taken on line 3 3 of Fig. 1, showing the center arbor and the manner of fixing the chart thereon.

In all the figures the letter A represents the top plate of a clock-movement, and B the bottom plate, $a$ the pillars or posts for holding the two plates together, $a'$ the screws, $g$ the square end of the actuating-arbor upon which the ratchet-wheel $i$ is placed, 5 the escape-wheel and pinion, $p$ the pallets, and $c$ the balance-wheel, these parts being of common usage. The actuating-wheel is designated by 1, the center wheel by 2, the center arbor by $e$, the third wheel and pinion by 3, and the fourth wheel and pinion by 4.

The actuating-wheel 1 (shown in Fig. 2) may be constructed in different manners, as is well known. In one construction it is made with a barrel, in which the spring (not shown) is coiled, and in this construction the arbor remains stationary during the operation of the clock, while the wheel and barrel rotate upon the arbor. By another and different construction the arbor turns with the wheel during the operation of the clock, while the barrel in spring-clocks remains stationary and in weight-clocks the arbor, the wheel, and the barrel all turn during the operation of the clock, it being of common usage to construct an actuating-wheel in either of the above-mentioned manners.

The usual time-train of a clock consists of a center wheel making one revolution in an hour, a third wheel and pinion, a fourth wheel and pinion, with an escapement—that is, three wheels and two pinions, aside from the escapement, constitute the time-train of an ordinary clock. Preferably the escapement of watches and clocks is arranged to cause the revolution of the fourth wheel once in sixty seconds or one minute. By reference to Fig. 2, which is intended to represent the construction of the fourth wheel making one revolution in a minute, it will be seen that I have added two extra wheels and pinions between the so-called "third" wheel and pinion of usual construction and the center wheel. These extra wheels and pinions are wheel X, pinion X', wheel Y, and pinion Y'. Assuming that the fourth wheel (marked 4 in Fig. 2) is provided with a pinion of eight leaves, making one revolution in a minute, (which is a common construction,) taking into the third wheel, (marked 3,) having sixty teeth and provided with a pinion of eight leaves taking into the extra wheel Y, having sixty-four teeth and provided with a pinion of ten leaves taking into the extra wheel X, having sixty teeth and provided with a pinion of fifteen leaves taking into the center wheel 2, having sixty teeth, then the center wheel 2 and its arbor $e$ will make one revolution in twenty-four hours. Therefore it will be seen by the explanation heretofore given and in connection with the drawings that I cause the revolution of the center arbor once in twenty-four hours by the addition of two wheels and pinions to the ordinary time-train of wheels and pinions with which a clockwork is usually provided.

In all clockworks running one week or more as at present constructed wherein the center arbor rotates once an hour it becomes a necessity and always has been the universal custom to connect the actuating-wheel with the arbor of the center wheel by means of fixing a small pinion, usually of ten or twelve leaves, upon the center arbor, (this pinion being in addition to the center wheel,) and an intermediate wheel and pinion is made use of to connect the actuating-wheel with the said small pinion upon the center arbor. This construction is absolutely required in a clock running one week or more as ordinarily constructed wherein the center arbor rotates once in an hour in order to obtain sufficient length of running time. It is obvious that this construction necessitates the use of much greater and coarser wheels and pinions and much larger pivots, thereby greatly increasing the friction and necessitating the use of a much larger power to operate the clock than is required by my construction of introducing two extra wheels and pinions in the time-train between the center wheel and the third-wheel pinion. Again, it is evident that neither the above construction nor any similar construction can be applied with practical results to a clockwork of my construction as herein set forth, wherein the center arbor rotates once in twenty-four hours, as the amount of power required to operate the clock would be far beyond the limits of isochronal action, and therefore useless as a timepiece. To obviate this difficulty and not only to keep within the limit of power required by good timekeeping constructions, but also to greatly reduce the amount of power heretofore required to operate an eight-day clock, I have devised the construction of meshing the teeth of the actuating-wheel directly with the teeth of a wheel or gear upon the center arbor (shown in Fig. 2) in the simpler form of meshing the teeth of the actuating-wheel directly with the teeth of the center wheel, thereby so increasing the leverage and simplifying the construction that a clock constructed as herein shown and set forth will not only operate with much less power than will a clock of the ordinary construction, but its isochronal qualities are greater and its durability is largely increased.

Referring to Fig. 3, the center wheel 2 is shown as rigidly fixed upon the center arbor $e$, and upon the center arbor $e$ is rigidly fixed or attached a disk D, having a quill or extension forming a part of the disk D, through which the arbor $e$ passes. This quill is also provided with a screw-thread on its outside, upon which the hollow nut $f$ is fixed by means of a similar screw-thread cut within the hole through its center, and under this nut $f$ and upon the disk D is placed a washer $n$, and between the disk D and the washer $n$ is placed the chart or dial G, which is centered upon the disk D by the extension or quill passing through a hole in the center of the chart G and being clamped thereon by turning down the nut $f$ upon the washer $n$. It will be observed that the disk D is tightly fitted upon the center arbor $e$ and is also rigidly fixed thereon by the pin S, passing through the quill or extension of the disk D and through the center arbor $e$, so that no movement of the disk D can take place independent of the center arbor $e$. By the arrangement described it will be seen that I dispense with the usual dial-wheels and that the recording-chart will be rigidly held, as the power of the clock-spring tends to hold the center arbor firmly in one direction at all times.

It is evident from the preceding explanation that my improvements are designed to be and may be readily adapted and applied to various different clock constructions.

Having thus explained the nature of the invention and described a way of constructing and using the same, although without attempting to set forth all of the forms in which it may be made or all of the modes of its use, I declare that what I claim is—

1. A clock-movement, comprising an actuating-wheel and its arbor, an escapement, and the usual third and fourth train-wheels, and pinions, including a center arbor, having a wheel-gear intermeshing with the actuating-wheel, two extra wheels and pinions interposed in the train between a gear upon the center arbor and the usual third-wheel pinion, thereby transmitting the power from the center arbor to the said third-wheel pinion, the gears being so proportioned as to cause the rotation of the center arbor once in twenty-four hours, and means for rigidly securing a chart upon the said center arbor, whereby the chart is held against "back-lash" and is made to rotate with the said arbor.

2. A clock-movement comprising an actuating-wheel 1, and its arbor $g$, an arbor $e$ having a single gear-wheel 2 intermeshing with and driven by the wheel 1, an escapement, and the usual train-wheels and pinions, 3, 4, an arbor having a pinion X' intermeshing with and driven by the single gear-wheel 2 on the center arbor $e$, and also having a wheel X, and an arbor having a pinion Y' intermeshing with and driven by the wheel X, and also having a wheel Y intermeshing with and driving the pinion of the usual third wheel 3, substantially as set forth.

3. A clock-movement comprising an actuating-wheel and its arbor, an escapement, the usual third and fourth train-wheels and pinions, and a center arbor, having a wheel-gear intermeshing with the actuating-wheel, two extra wheels and pinions interposed in the train between the wheel-gear of the center arbor, and the usual third-wheel pinion, for transmitting the power from the center arbor to the said third-wheel pinion, with means for rigidly securing a chart upon one of the said arbors, whereby said chart is held against "back lash" and is made to rotate with the arbor.

In testimony whereof I have signed my name to this specification, in the presence of two subscribing witnesses, this 14th day of September, A. D. 1897.

FLORENTINE A. JONES.

Witnesses:
C. F. BROWN,
A. D. HARRISON.